US006885509B2

(12) United States Patent
Wallerstein et al.

(10) Patent No.: US 6,885,509 B2
(45) Date of Patent: Apr. 26, 2005

(54) IMAGING ARRANGEMENT WHICH ALLOWS FOR CAPTURING AN IMAGE OF A VIEW AT DIFFERENT RESOLUTIONS

(75) Inventors: Edward P. Wallerstein, Pleasanton, CA (US); Edward Driscoll Jr., Portola Valley, CA (US); Willard Curtis Lomax, Sunnyvale, CA (US)

(73) Assignee: Be Here Corporation, Fremont, CA (US)

( * ) Notice: Subject to any disclaimer, the term of this patent is extended or adjusted under 35 U.S.C. 154(b) by 751 days.

(21) Appl. No.: 09/894,760

(22) Filed: Jun. 27, 2001

(65) Prior Publication Data

US 2002/0012059 A1 Jan. 31, 2002

Related U.S. Application Data

(60) Division of application No. 09/439,114, filed on Nov. 12, 1999, now Pat. No. 6,493,032, which is a continuation-in-part of application No. 09/175,157, filed on Oct. 19, 1998, now Pat. No. 6,341,044, which is a continuation-in-part of application No. 09/137,660, filed on Aug. 20, 1998, now Pat. No. 6,373,642, which is a continuation-in-part of application No. 08/872,525, filed on Jun. 11, 1997, now Pat. No. 6,459,451.

(60) Provisional application No. 60/020,292, filed on Jun. 24, 1996.

(51) Int. Cl.$^7$ .............................. G02B 13/06
(52) U.S. Cl. ..................... 359/725; 359/729
(58) Field of Search ................. 359/725, 727, 359/726, 364, 402, 403, 458, 618, 729

(56) References Cited

U.S. PATENT DOCUMENTS

5,473,474 A  * 12/1995 Powell ................ 359/725
6,175,454 B1 *  1/2001 Hoogland et al. ......... 359/725

* cited by examiner

*Primary Examiner*—Hung Xuan Dang
(74) *Attorney, Agent, or Firm*—Bever, Hoffman & Harms, LLP; Edward S. Mao

(57) ABSTRACT

The invention provides a method of viewing an image. Light is projected from the image. The projected light is split into first and second bundles of light focusing over a first and a second focal region respectively. The light at the first focal region is detected at a first resolution. The light at the second focal region is detected at a second resolution different from the first resolution.

10 Claims, 7 Drawing Sheets

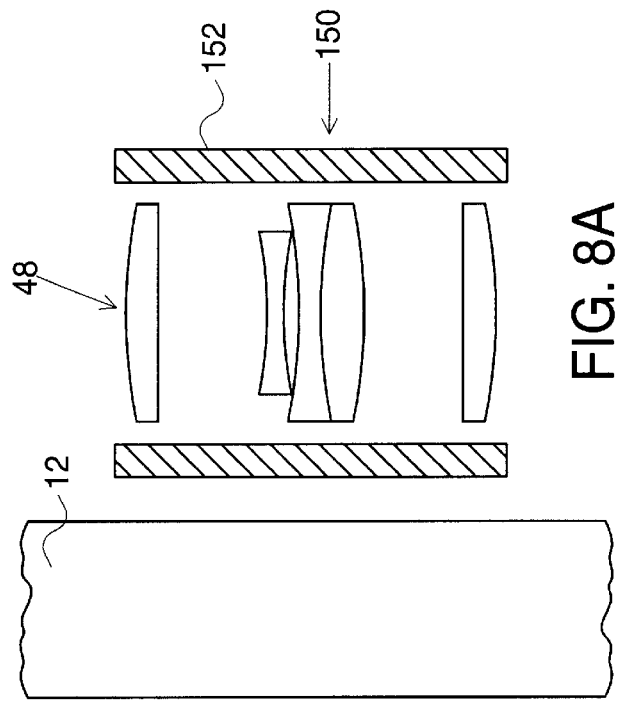
FIG. 9A
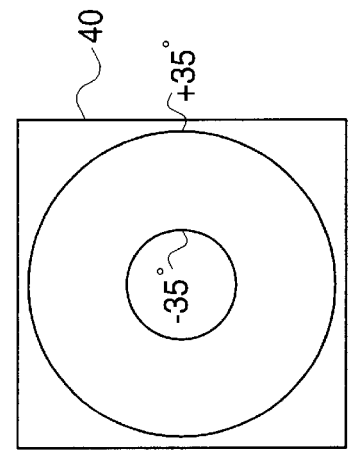
FIG. 9B
FIG. 8A
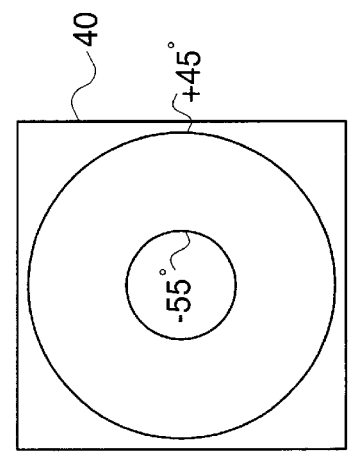
FIG. 8B

IMAGING ARRANGEMENT WHICH ALLOWS FOR CAPTURING AN IMAGE OF A VIEW AT DIFFERENT RESOLUTIONS

This patent application is a continuation-in-part of U.S. patent application Ser. No. 09/175,157 filed Oct. 19, 1998 now U.S. Pat. No. 6,341,044 which is a continuation-in-part of U.S. patent application Ser. No. 09/137,660 filed Aug. 20, 1998 now U.S. Pat. No. 6,373,642 which is a continuation-in-part of U.S. patent application Ser. No. 08/872,525 filed Jun. 11, 1997, now U.S. Pat. No. 6,459,451 which claims priority from U.S. Provisional Patent Application Ser. No. 60/020,292 filed Jun. 24, 1996.

BACKGROUND OF THE INVENTION

1). Field of the Invention

This invention relates to an imaging arrangement of the kind capable of capturing light received from a scene, and to a method of capturing an image of a scene, in particular at different resolutions.

2). Discussion of Related Art

Panoramic imaging arrangements have become popular in recent years for purposes of viewing 360° surrounding panoramic scenes. Older generations of panoramic imaging arrangements generally consisted of revolving periscope-like constructions having relatively complex mechanisms for revolving them. More recently, stationary panoramic imaging arrangements have been developed. A stationary panoramic imaging arrangement generally has one or more lenses, each having a vertically extending axis of revolution, which are used to refract or reflect light received from a 360° surrounding panoramic scene. The lenses alter the direction of the light, whereafter the light passes through a series of lenses which are located vertically one above the other and which further manipulate the light by, for example, focusing the light or altering the intensity of the light.

In an imaging arrangement of the above kind an image of a very large view can be captured on a digital imaging detector array. The digital imaging detector array typically has pixels which are located relative to one another so that the image is digitized to a required resolution suitable for viewing, but not to a resolution which may be excessively high for purposes of transmitting data of the image and for processing the data.

Software may be used for isolating specific portions of the image and then enlarging the portions for better viewing. When such an area is enlarged, detail of the portion of the image which is visible is usually limited because of the resolution at which the image is digitized. In certain instances, it may therefore be required that light from a portion of an image be captured at a higher resolution.

SUMMARY OF THE INVENTION

The invention provides a method of viewing an image. Light is projected from the image. The projected light is split into first and second bundles of light focusing over a first and a second focal region respectively. The light at the first focal region is detected at a first resolution. The light at the second focal region is detected at a second resolution different from the first resolution.

BRIEF DESCRIPTION OF THE DRAWINGS

The invention is further described by way of examples with reference to the accompanying drawings wherein:

FIG. 8A is a cross-sectional side view of a portion of the panoramic imaging arrangement which is modified so that a set of lenses thereof is mounted to a support frame in the form of an interchangeable module;

FIG. 8B is a plan view illustrating how an image is focused on a digital imaging detector array of the panoramic imaging arrangement utilizing the set of lenses of FIG. 8A;

FIG. 9A is a cross-sectional side view of an alternative module including an alternative set of lenses; and FIG. 9B is a plan view which illustrates how an image is formed on the digital imaging detector array when the alternative module of FIG. 9A is used.

DESCRIPTION OF PREFERRED EMBODIMENTS

Figure 1:
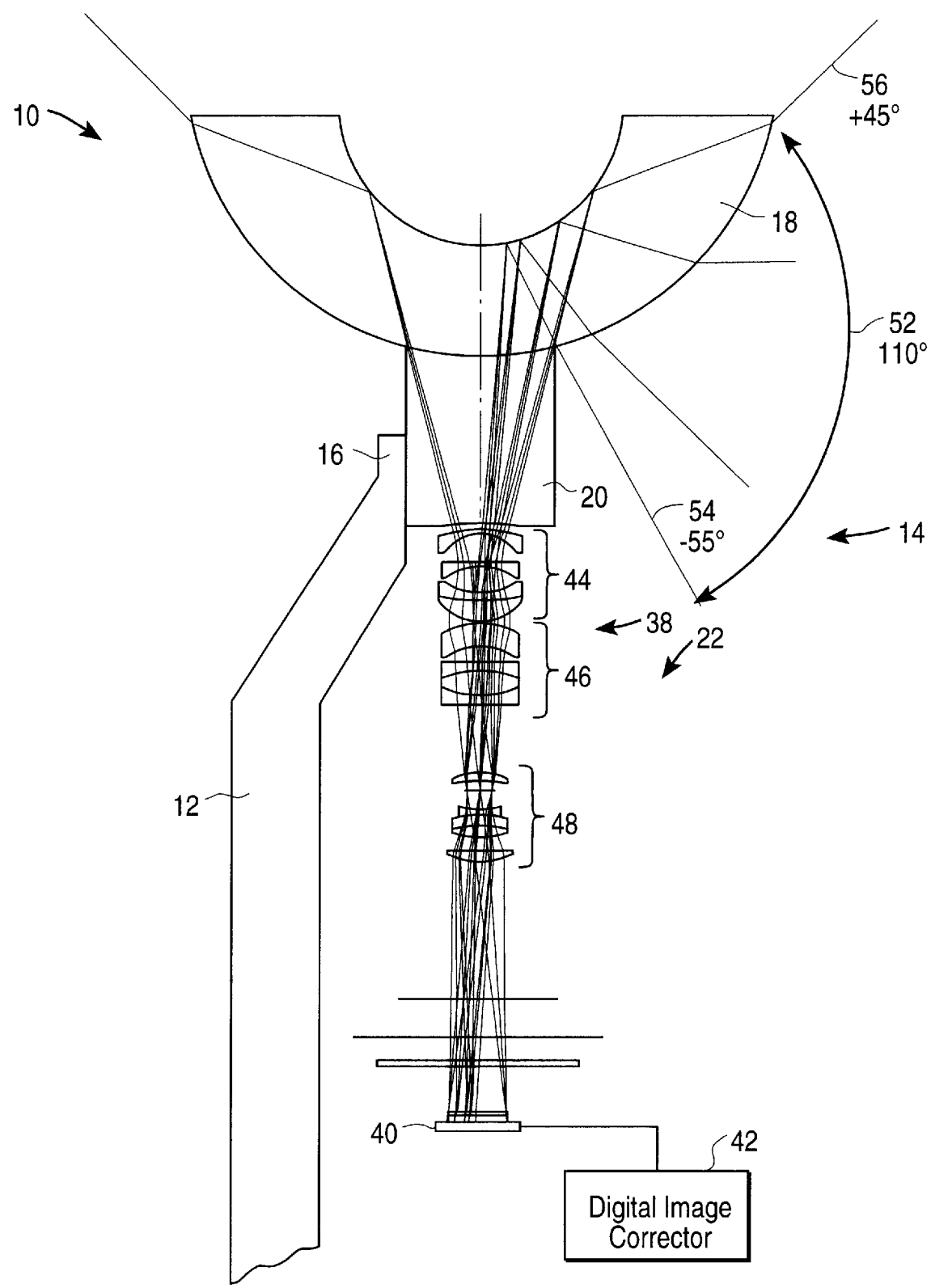
FIG. 1 is a side view illustrating apparatus, according to an embodiment of the invention, for capturing in a panoramic scene.

FIG. 1 of the accompanying drawings illustrates apparatus 10, according to an embodiment of the invention, for capturing a panoramic scene. The apparatus 10 includes a vertically extending support structure 12, and a panoramic imaging arrangement 14 which is secured to an upper end 16 of the support structure 12.

The support structure 12 may be any device having an upper end 16 which is high enough for purposes of providing a viewpoint of a panoramic scene. The support structure 12 is typically part of a housing for the panoramic imaging arrangement 14 and may, for example, include a vertically extending post, a tripod stand, or part of building structure.

The panoramic imaging arrangement 14 includes a first, upper lens block 18, a second, lower lens block 20, and apparatus 22, positioned below the second lens block 20, for manipulating light so as to correct certain aberrations of the light and to focus the light (hereinafter generally referred to as the "light manipulation apparatus 22").

Figure 2:
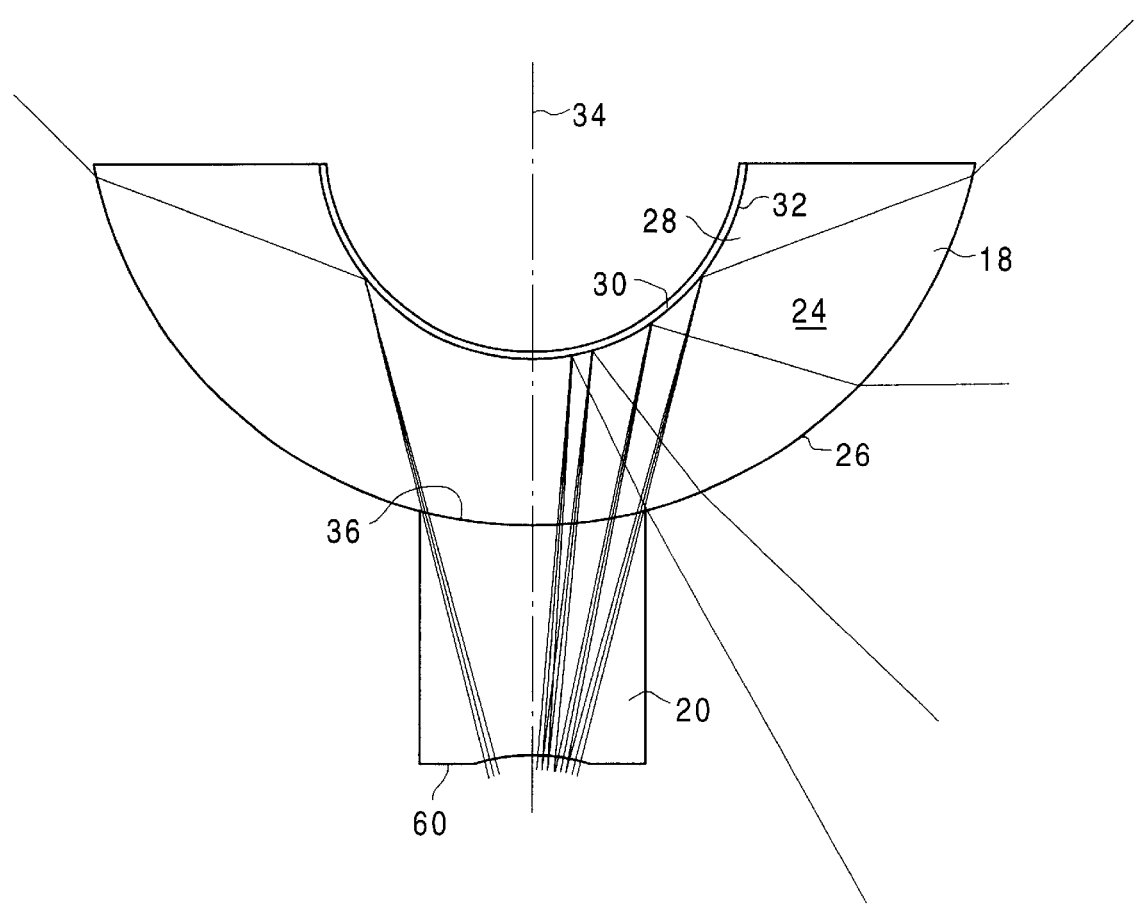
FIG. 2 is an enlarged view of first and second lens blocks forming part of the apparatus of FIG. 1.

FIG. 2 is an enlarged view of the first and second lens blocks 18 and 20.

The first lens block 18 includes a transparent component or refractive lens 24 which has a substantially spherical convex outer and lower surface 26, and a substantially spherical concave inner and upper surface 28. Center points of the convex outer surface 26 and the concave inner surface 28 of the transparent lens 24 substantially coincide with one another.

The concave inner surface 28 is covered with a thin layer of reflective material 30. After the reflective material 30 is deposited, a substantially spherical convex reflective surface 32 (sometimes generally referred to herein as a "convex reflective lens") is provided against the transparent lens 24. The transparent lens 24 so covers the convex reflective surface 32, thereby providing a shield protecting the convex reflective surface 32 against environmental conditions which may otherwise cause damage to the convex reflective surface 32.

The convex outer surface 26 of the transparent lens 24 and the convex reflective surface 32 have a common, substantially vertical axis of revolution 34.

The second lens block 20 is made out of cylindrical, transparent material. An upper end 36 of the second lens block 20 has a substantially spherical concave surface which conforms with the convex outer surface 26 of the transparent lens 24.

The transparent lens 24 and the second lens block 20 are secured to one another by means of a transparent optical cement (not shown) which is located between the upper end 36 of the second lens block 20 and the convex outer surface 26 of the transparent lens 24. Transparent optical cements of the above kind are known in the art.

Referring again to FIG. 1, the light manipulation apparatus 22 includes a system of lenses 38, a digital detector array 40, and a digital image corrector 42.

The system of lenses 38 includes a first set of lenses 44, a second set of lenses 46, and a third set of lenses 48. The lenses work together to correct aberrations of light. Generally speaking the first set of lenses 44 is designed and configured to reduce astigmatism, the second set of lenses 46 for doing color correction, and the third set lenses 48 for creating an image of suitable scale and for fine-tuning certain other system aberrations as will further be discussed herein. One skilled in the art of optics will appreciate that the respective sets of lenses 44, 46, and 48 are of conventional kind although their collective effect may be unique in completing the present embodiment. Further details of such lenses may be found in a handbook on modern optics such as in "Modern Optical Engineering" by Warren J. Smith (McGraw Hill, Inc.; 1990).

The panoramic imaging arrangement 14 is secured to the upper end 16 of the support structure 12 by mounting the second lens block 20 directly to the upper end 16 of the support structure 12. No metal or other components are therefore secured to the first lens block 18.

In use, light is received laterally from a 360° panoramic scene surrounding the first lens block 18 (see FIG. 2). Light from the panoramic scene enters the convex outer surface 26 of the transparent lens 24 of the first lens block 18 for an unbroken and continuous included angle 52 located in a vertical plane. The included angle 52 is about 110° covering more than a hemisphere and extends from an angle 54 which is about 55° below the horizon to an angle 56 which about 45° above the horizon. (The included angle 52 is therefore at least 60° and preferably at least 90°, and the angles 54 and 56 below and above the horizon are each therefore at least 30° below and above the horizon.)

It should be noted that the lens blocks 18 and 20 are mounted to the support structure 12 so that light from the panoramic scene is capable of passing over the upper end 16 of the support structure 12, i.e., without the support structure obscuring light from the panoramic scene.

Light from the panoramic scene is refracted slightly upwardly when entering the transparent lens 24. The light then travels through the transparent lens 24 and is reflected downwardly from the convex reflective surface 32. The light then passes downwardly through the transparent lens 24 and exits the transparent lens 24 downwardly through the convex outer surface 26.

The light then passes through the transparent optical cement located between the first and second lens blocks 18 and 20, whereafter the light enters the second lens block 20 through the upper end 36 thereof. The second lens block 20 has a diameter which is sufficiently large so that light from the entire included angle 52, after being reflected by the convex reflective surface 32, enters the second lens block 20 through its upper end 36. The light then travels through the second lens block 20 and exits the second lens block through a lower end 60 thereof. Although not shown in particular detail in the figures, the cylindrical outer surface of the second lens block 20 is typically covered to prevent light from entering into the second lens block 20 in a sideways direction. This may be accomplished with the upper end 16 of the support structure shown in FIG. 2.

Should an attempt be made to focus the light after leaving the second lens block 20, certain aberrations would be noticed. These aberrations include astigmatism, abnormality in color, lack of image plane flatness, and a value of f-theta which is less than 1. The value f-theta is indicative of how much compression of view occurs in a vertical direction of an image view, resulting in more vertical compression in one area of the image view than in another area of the image view. Values of f-theta are expressed as fractions of 1 so that a value of f-theta approaching 1 would be indicative of more uniform compression, and a value of f-theta which is a smaller fraction of 1 would be indicative of more non-uniform compression.

A number of factors, alone and in combination, contribute to these aberrations, including the relatively large size of the included angle 52, the relatively low inclination of the angle 54 below the horizon, the relatively high inclination of the angle 56 above the horizon, and the particular choice of lenses, including the choice of a substantially spherical convex outer surface 26 of the transparent lens 24, and the substantially spherical convex reflective surface 32. These aberrations occur even though a reflective surface 32 is used which causes less aberrations in color than a refractive surface would and even though the transparent lens 24 has a convex outer surface 26 which assists greatly in reducing aberrations.

The light manipulation apparatus 22 (see FIG. 1), however, functions to correct or at least to reduce these aberrations.

In particular, the first set of lenses 44 is positioned so that light from the second lens block 20 passes through the first set of lenses 44. The first set of lenses 44 then generally corrects or at least reduces astigmatism of the light to an acceptable level.

The second set of lenses 46 is positioned to receive the light, after passing through the first set of lenses 44, and generally functions so as to do color correction of the light.

The third set of lenses 48 is positioned to receive light, after passing through the second set of lenses 46, and generally functions to reduce the effect of compression so that the value f-theta is adjusted closer to 1, typically to a value above 0.5. The third set of lenses 48 also functions to flatten the image plane and focus the image on the digital detector array 40.

Certain aberrations may still exist, even after the light passes through the system of lenses 38. For example, the value of f-theta, although adjusted to be closer to 1, may still be somewhat below 1.

The digital image corrector 42 is coupled to the digital detector array 40 so as to receive the image captured by the digital detector array 40. The digital image corrector 42 is capable of adjusting the image so as to correct for certain, still existing aberrations. For example, the digital image corrector 42 may adjust f-theta so as to be closer or substantially equal to 1. One skilled in the art would appreciate that the digital image corrector 42 typically has a processor and memory with an executable program which corrects the aberrations in the light referred to.

As mentioned previously, one unique feature is that a substantially spherical convex reflective surface 32 is used which is protected from environmental conditions which may otherwise result in damage to the reflective surface 32. Reflective lenses generally have the advantage that they reflect light with little or no aberrations in color of the reflected light and convex reflective lenses have the added advantage that they require less power than, for example, concave reflective lenses.

It should also be evident from the aforegoing description that another advantage is that the panoramic imaging arrangement 14 can be mounted to the support structure 12 in a manner wherein the support structure 12 does not obscure light from a panoramic view from reaching the first lens block 18.

A further advantage of the invention is that lenses having substantially spherical surfaces are used. Spherical surfaces are easier to manufacture than paraboloidal, hyperboloidal, ellipsoidal or other aspheric surfaces and are therefore less expensive to manufacture.

Yet a further advantage is that a relatively large included angle 52 can be received which extends from a relatively large angle 54 below the horizon to a relatively large angle 56 above the horizon.

Although spherical surfaces are used, at least one of which having a reflective surface, and regardless of the choice of angles 52, 54, and 56, a final image is created which is corrected for astigmatism and color, which is flattened, and in which the value of f-theta is controlled.

Figure 3:
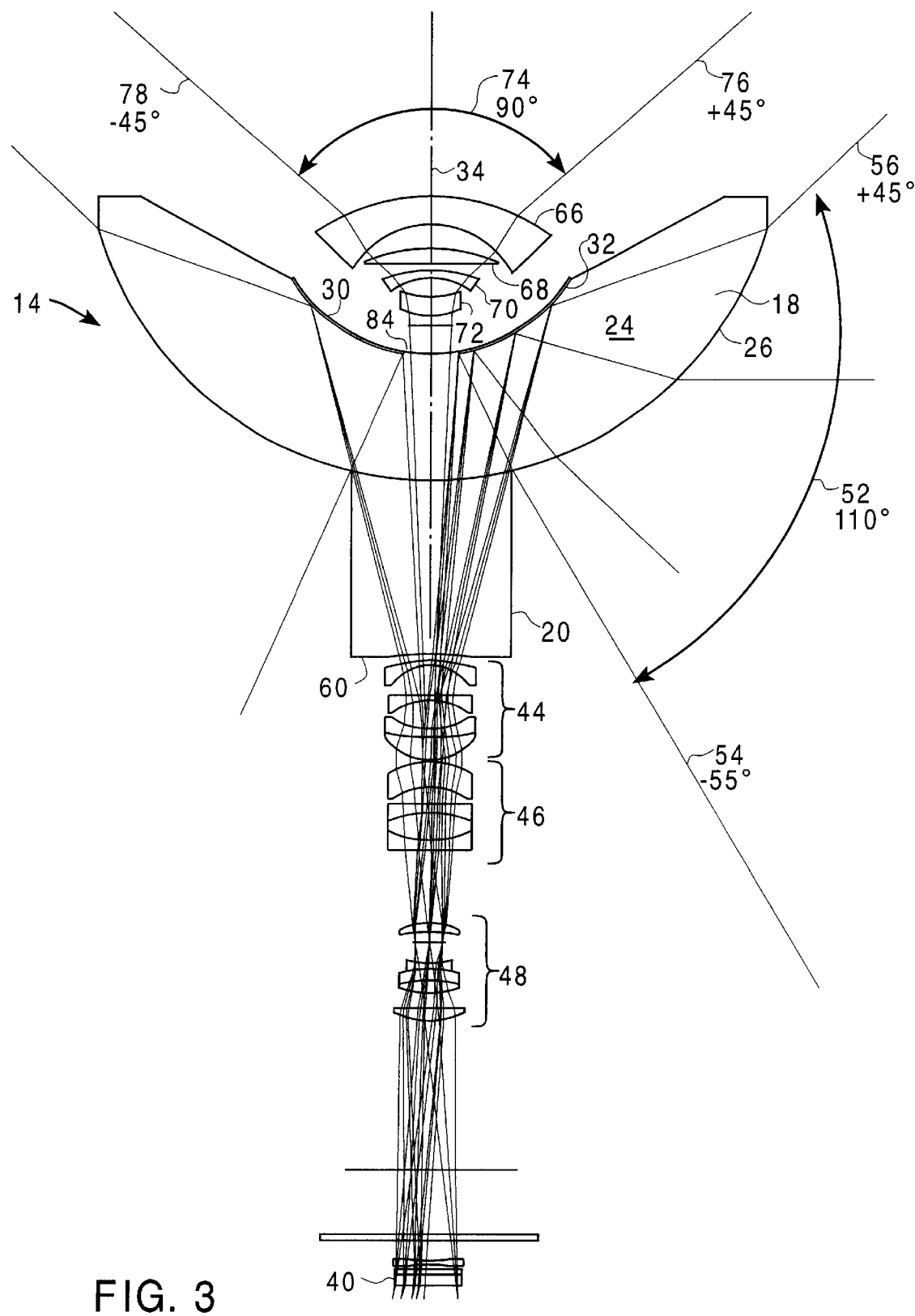
FIG. 3 is a side view of a panoramic imaging arrangement forming part of the apparatus for capturing the panoramic scene of FIG. 1, which is complemented by a system of lenses positioned to receive light from a second scene which is located above the panoramic scene.

It can be seen from FIG. 1 that the upper lens block 18 is capable of receiving light directly from a surrounding panoramic scene up to an angle 56 which is about 45' above the horizon. The upper lens block 18 therefore has a "blind spot" of about 90° located above the angle 56. The first lens block 18 is therefore capable of receiving light from the first, 360° surrounding panoramic scene but is unable to receive light from a second scene, perhaps the sky, which is located above the panoramic scene. FIG. 3 is a sectioned side view of the panoramic imaging arrangement 14 wherein the upper lens block 18 is complemented by a system of lenses 66, 68, 70 and 72 located above the upper lens block 18, each having a vertical axis of revolution which substantially coincides with the axis of revolution 34 of the convex outer surface 26 and the convex reflective surface 32.

The lens 66 is located above the lenses 68, 70 and 72 and is positioned to receive light directly from the second scene which is located above the panoramic scene. The lens 66 receives light from the second scene for an unbroken included angle 74, located in a plane of the axis of the revolution 34, of about 90° extending from an angle 76 which is located about 45° below vertical, over vertical, to an angle 78 on an opposing side of about 45° below vertical. The lens 66 therefore receives light from the blind spot of the upper lens block 18. The total included angle of light received by the first lens block 18 and the lens 66 is therefore 310° (twice in the unbroken included angle 52 of about 110° plus the unbroken included angle 54 of about 90°).

After passing through and being refracted by the lens 66, the light from the second scene then passes through and is refracted by the lenses 68, 70 and 72. The lenses 66, 68, 70 and 72 may be shown in conceptual detail only. One of ordinary skill in the art would however appreciate that the configuration of the lenses 66, 68, 70 and 72 may be of conventional kind and may be similar to a conventional wide angle lens arrangement.

Figure 4:
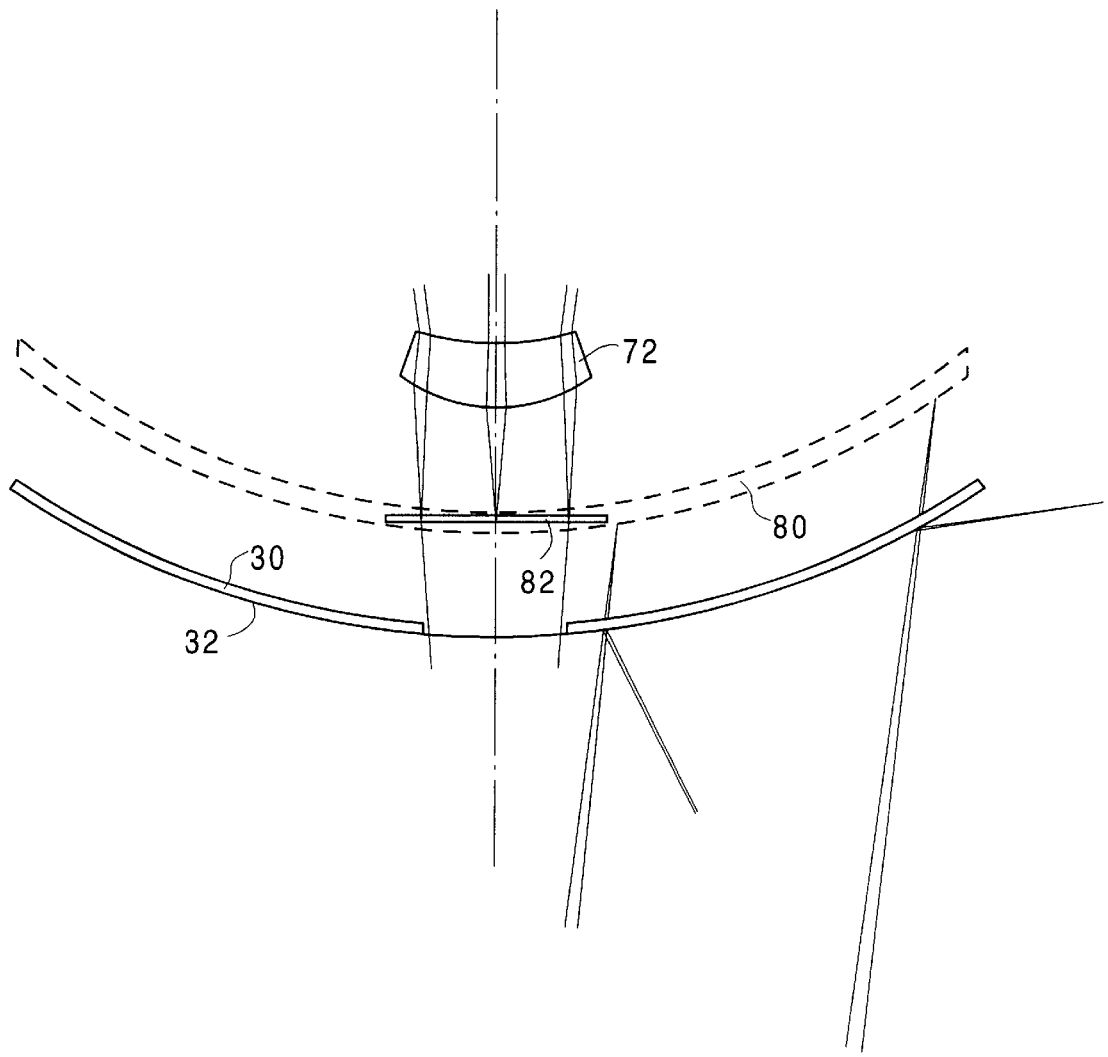
FIG. 4 is an enlarged view illustrating the positioning of a virtual image plane created by the first lens block, and a focal plane of the system of lenses.

FIG. 4 is an enlarged view illustrating in particular an area between the reflective surface 32 and the system of lenses 66, 68, 70 and 72. From a perspective below the reflective surface 32, a virtual image of the surrounding panoramic scene may be perceived in a planar zone 80 which is located between the reflective surface 32 and the system of lenses 66, 68, 70, and 72. When light reflected by the reflective surface 32 is then further manipulated as hereinbefore described, it would be the same as if light directly from the virtual image is further manipulated.

The system of lenses 66, 68, 70 and 72 is configured so as to project and focus light from the second scene on a virtual planar zone 82 which coincides with, or is located within the planar zone 80 of the virtual image. Although the zone 82 is shown as being flat, it should be understood that it may be curved, perhaps to conform with the zone 80 of the virtual image of the surrounding panoramic scene. The light from the second scene is then further refracted and further manipulated together with and in a similar manner to light reflected from the reflective surface 32, thus facilitating eventual focusing of light from both the first, surrounding panoramic scene and from the second scene.

Referring again to FIG. 3, an opening 84 is formed in the reflective material 30, forming the reflective surface 32, through which light, after leaving the lens 72, may pass into the transparent lens 24. The light from the second scene then passes through the transparent lens 24 and the second lens block 20 and exits the second lens block 20 through the lower surface 60 thereof.

The light from the second scene then passes through the respective sets of lenses 44, 46, and 48 together with light from the first, surrounding panoramic scene. Light requiring more correction for astigmatism or other aberrations generally passes through edge regions of the sets of lenses 44,46 and 48 and light requiring less correction generally passes through central regions of the sets of lenses 44, 46 and 48. For example, light from the angle 56 above the horizon requires more correction after being reflected from the reflective surface 32 than light from the angle 54 below the horizon, and accordingly passes through the sets of lenses 44, 46 and 48 further towards the edges thereof than light from the angle 54 below the horizon. Light coming from the system of lenses 66, 68, 70 and 72 may also require less correction than light reflected from the reflective surface 32, and accordingly passes through central regions of the sets of all lenses 44, 46 and 48 with correspondingly less correction of aberrations. Light from the second scene is then focused on the image capturing apparatus 40 together with light from the first, surrounding panoramic scene.

Figure 5:
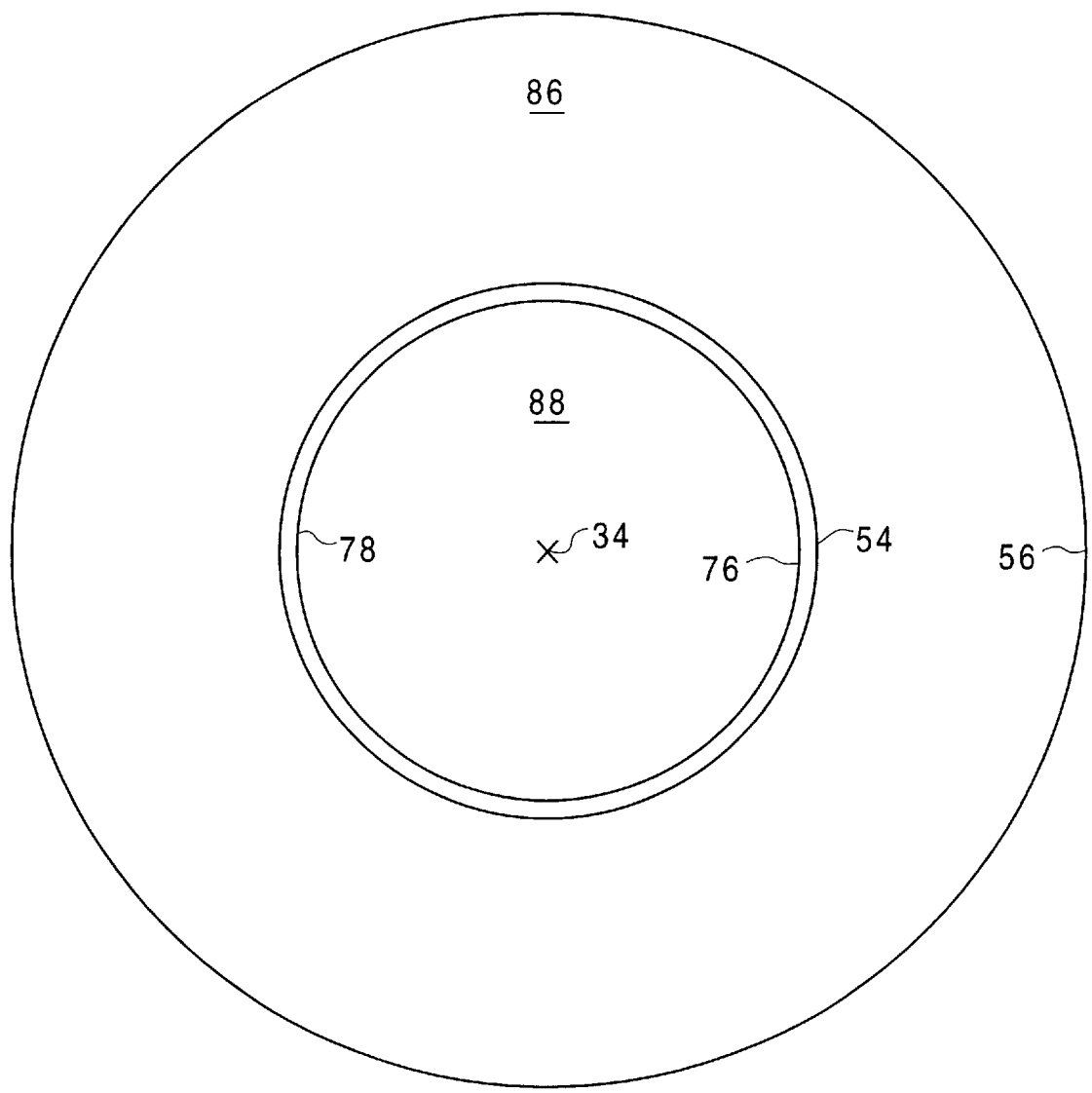
FIG. 5 is a view illustrating how light is focused on a digital detector array forming part of the panoramic imaging arrangement.

FIG. 5 illustrates the manner in which light from the first, surrounding panoramic scene and the second scene are focused on the digital detector array 40. Light from the first, surrounding panoramic scene focuses on an outer ring 86 with an inner edge of the ring 86 corresponding to the angle 54 located about 55° below the horizon and an outer edge of the ring 84 corresponding to the angle 56 located about 45° above the horizon. Light from the second scene focuses on a circle 88 located within the ring 86 with an outer edge of the circle 88 corresponding to the angles 76 and 78 located about 45° below vertical and a center of the circle corresponding to vertical.

Figures 6, 7:
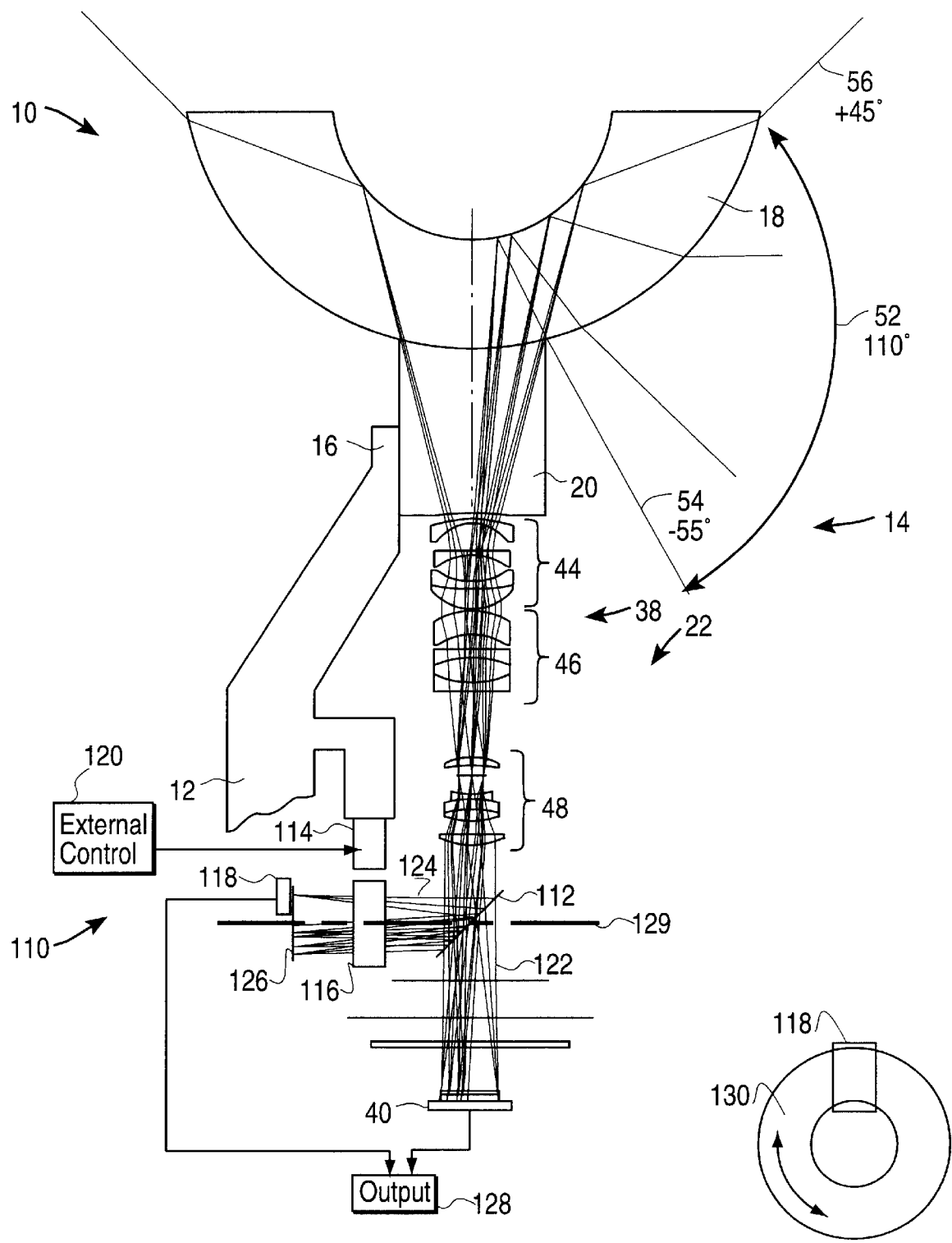
FIG. 6 is a cross-sectional side view of the panoramic imaging arrangement of FIG. 1 which is modified to include apparatus for capturing a high resolution image.
FIG. 7 is a view illustrating how light is focused and an image is rotated over another digital detector array used in the embodiment of FIG. 6.

FIG. 6 now illustrates one modification of the panoramic imaging arrangement 10 of FIG. 1 which, in addition, includes apparatus 110 for capturing a high resolution image of the panoramic scene. The apparatus 110 includes a half silvered mirror 112, an electric motor 114, a Pechan prism 116 and, in addition to the first digital imaging detector array 40, also a second digital imaging detector array 118.

The electric motor 114 is mounted to the support structure 12 and the Pechan prism 116 is rotatably mounted to the support structure 12. The electric motor 114 is connected to an external control 120 which is capable of operating the electric motor 114 so that the electric motor 114 rotates the Pechan prism 116.

The half silvered mirror 112 is located at about 45° relative to horizontal in a position between the third set of lenses 48 and the first digital imaging detector array 40. The half silvered mirror 112 is partially transmissive so that the light, after leaving the first set of lenses 48 is split into a first bundle of light 122 and a second bundle of light 124. The first bundle of light is a portion of the light which is transmitted through the half silvered mirror 112 and the second bundle of light is a portion of the light which is reflected by the half silvered mirror 112 in substantially a horizontal direction towards the Pechan prism 116.

The first bundle of light 122 focuses on the first digital imaging detector array 40 as hereinbefore described with reference to FIG. 1. The first digital imaging detector array 40 is large enough to capture the entire image focused thereon of the 360° surrounding panoramic scene for the entire included angle 52, and is connected to an output 128 so that data of the image focused thereon can be provided to the output 128. The output 128 typically includes a screen on which the entire panoramic scene, or at least a substantial portion thereof can be viewed. Because such a large area of the panoramic scene is viewed, it is not necessary to view smaller portions of the panoramic scene at high resolution. The first digital imaging detector array 40 therefore typically has a resolution of about 1,000 pixels on an X axis thereof and 1,000 pixels on a Y axis thereof, which is sufficient for purposes of viewing the entire panoramic scene at a reasonable resolution. The resolution of the first digital imaging detector array is however not so high as to substantially burden data transmission and processing of data of the image created thereon.

The second bundle of light 124 passes through the Pechan prism 116 and focuses in a focal region 126 in a plane of the second digital imaging detector array 118.

The second digital imaging detector array 118 has a much higher resolution than the first digital imaging detector array 40, typically about 2,000 pixels on an X axis thereof and 2,000 pixels on a Y axis thereof, and is used for viewing isolated areas of the 360° surrounding panoramic scene at high resolution. The second digital imaging detector array 118 is also connected to the output 128 so that the isolated regions of the 360° surrounding panoramic scene can be viewed on the screen thereof. The first digital imaging detector array 40 thus has an array of detectors positioned relative to one another to detect the image of the 360° surrounding panoramic scene at a first resolution, and the second digital imaging detector array 118 as an array of detectors positioned relative to one another to detect only a portion of the 360° surrounding panoramic scene at a second resolution which is higher than the first resolution.

The focal region 126 of the second bundle of light 124 is larger than the second digital imaging detector array. By operating the external control 120, the electric motor 114 can rotate the Pechan prism 116 about an axis 129 extending in the direction of travel of the second bundle of light 124. Rotation of the Pechan prism 116 causes rotation of the image created at the focal region 126.

FIG. 7 illustrates the positioning of the image 130 created at the focal region 126, and the positioning of the second digital imaging detector array 118. As with the image created on the first digital imaging detector array 40, the image 130 is also in the shape of a ring. Rotation of the Pechan prism 116 causes rotation of the image 130 about a center point thereof and angular displacement of the second bundle of light 124 about the axis 128 by an angle which is twice the angle of rotation of the Pechan prism 116. A portion of the 360° surrounding panoramic scene which is to be viewed at high resolution can, by rotating the image 130, be selectively positioned over the second digital imaging detector array 118. The digital imaging detector array 118 may then detect the required portion of the 360° surrounding panoramic scene at high resolution and provide data of the image to the output 128.

FIG. 8A illustrates another modification of the panoramic imaging arrangement of FIG. 1 or FIG. 6 which allows for capturing of an image of the 360° surrounding panoramic scene at a higher resolution. FIG. 8A illustrates a portion of the panoramic imaging arrangement, including a portion of the support structure 12, and a module 150 which includes a support frame 152 and the third set of lenses 48.

The third set of lenses 48 is permanently mounted to the support frame 152. The support frame 152 is subsequently releasably mounted to the support structure 12. As previously mentioned, the support structure is typically part of a housing for the panoramic imaging arrangement. The support frame 152 may be located within the housing and be releasably attached thereto or may be in the form of an extension of the housing.

As illustrated in FIG. 8B and previously described with reference to FIG. 5, an image is formed on the digital imaging detector array 40 which is in the form of a ring which includes light from 55° below the horizon to 45° above the horizon. An image so created may be advantageous when it is required to capture an image of a scene which includes a large included angle in a vertical plane.

In other instances it may be required to view a smaller included angle at a higher resolution. FIG. 9A illustrates an alternative module 150A which can be interchanged with the module 150 of FIG. 8A. The module 150A includes a support frame 152A which is identical to the support frame 152 of FIG. 8A, and an alternative third set of lenses 48A mounted to the support frame 152A. When the support frame 152A is mounted to the support structure 12, the alternative third set of lenses 48A is located in a position wherein the alternative third set of lenses 48A receives a portion of the light passing through the series of lenses including the upper lens block 12, the lower lens block 20, the first set of lenses 44, and the second set of lenses 46. The alternative third set of lenses 48A is configured so that light leaving the alternative third set of lenses 48A includes light only from an included angle which is smaller than and located within the included angle 52 of FIG. 1.

For example, FIG. 9B illustrates that the alternative third set of lenses 48A forms an image on the digital imaging detector array 40 in the form of a ring which includes light only from an included angle extending from 35° below the horizon to 35° above the horizon. An image of a smaller portion of the scene is thus formed on the digital imaging detector array 40. The ring of FIG. 9B is substantially the same size as the ring of FIG. 8B so that, although the image captured in FIG. 9B is captured at the same resolution as the image captured in FIG. 8B, a smaller portion of the image is captured in FIG. 9B over the same area as in FIG. 8B. The portion of the image captured in FIG. 9B is thus captured at a higher resolution than the same portion of the image captured in FIG. 8B.

In the same manner, another module may be used which, for example, ensures that only light is captured from an included angle extending from 45° below the horizon to 45° above the horizon, or from 40° below the horizon to 40° above the horizon, depending on requirement.

While certain exemplary embodiments have been described and shown in the accompanying drawings, it is to be understood that such embodiments are merely illustrative and not restrictive of the current invention, and that this invention is not restricted to the specific constructions and arrangements shown and described, since modifications may occur to those ordinarily skilled in the art.

What is claimed:

1. An imaging arrangement which includes:

a support structure;

a series of lenses mounted to the support structure and capable of receiving light from a scene and projecting the light, wherein light leaving the series of lenses includes light from an entire first included angle measured from a first angle to a second angle, the first angle being from the series of lenses to a first location of the scene and the second angle being from the series of lenses to a second location of the scene; and a module which includes:

a support frame; and a set of lenses mounted to the support frame, the support frame being releasably mounted to the support structure in a position wherein the set of lenses receives at least a portion of the light after leaving the series of lenses, the light then passing through the set of lenses and leaving the set of lenses, the set of lenses being configured so that light leaving the set of lenses includes light from a second included angle only which is smaller than and located within the first included angle.

2. An imaging arrangement as in claim 1 wherein the scene is a 360° surrounding panoramic scene.

3. An imaging arrangement as in claim 2 wherein the first included angle is located below the horizon and the second angle is located above the horizon.

4. An imaging arrangement as in claim 3 wherein the first included angle is at least 90°.

5. An imaging arrangement as in claim 4 wherein the second included angle is at least 20° smaller than the first included angle.

6. An imaging arrangement as in claim 1 wherein the second included angle is at least 20° smaller than the first included angle.

7. An imaging arrangement as in claim 1 wherein the set of lenses focuses the light in a plane which is substantially flat.

8. In an imaging arrangement comprising a support structure and a series of lenses mounted to the support structure, a method which includes the step of:

releasably mounting a support frame of a module to the support structure, the module including a set of lenses mounted to the support frame, wherein the series of lenses is capable of receiving light from the scene and projecting the light, light leaving the series of lenses including light from an entire first included angle measured from a first angle to a second angle, the first angle being from the series of lenses to a first location of the scene and the second angle being from the series of lenses to a second location of the scene, and the set of lenses being located in a position to receive at least a portion of the light after leaving the series of lenses, the light then passing through the set of lenses and leaving the set of lenses, the set of lenses being configured so that light leaving the set of lenses includes light from a second included angle only which is smaller than and located within the first included angle.

9. A method as in claim 8 wherein the scene is a 360° surrounding panoramic scene, the first angle is located below the horizon and the second angle is located above the horizon.

10. A method of creating an image of a scene, which includes:

projecting light through a series of lenses mounted to a support structure wherein light leaving the series of lenses includes light from an entire first included angle measured from a first angle to a second angle, the first angle being from the series of lenses to a first location of the scene and the second angle being from the series of lenses to a second location of the scene; and passing at least a portion of the light through a set of lenses after leaving the series of lenses, the set of lenses being mounted to a support frame which is releasably mounted to the support structure, wherein light leaving the set of lenses includes light from a second included angle only which is smaller than and located within the first included angle.

* * * * *